US009064400B2

(12) United States Patent
Malins et al.

(10) Patent No.: US 9,064,400 B2
(45) Date of Patent: Jun. 23, 2015

(54) FENCING

(75) Inventors: Craig David Malins, Hamilton (NZ); Ian Stuart Gallagher, Hamilton (NZ)

(73) Assignee: GALLAGHER GROUP LIMITED, Hamilton (NZ)

( * ) Notice: Subject to any disclaimer, the term of this patent is extended or adjusted under 35 U.S.C. 154(b) by 109 days.

(21) Appl. No.: 13/878,364

(22) PCT Filed: Sep. 30, 2011

(86) PCT No.: PCT/NZ2011/000204
§ 371 (c)(1),
(2), (4) Date: Apr. 8, 2013

(87) PCT Pub. No.: WO2012/047117
PCT Pub. Date: Apr. 12, 2012

(65) Prior Publication Data
US 2013/0187784 A1    Jul. 25, 2013

(30) Foreign Application Priority Data
Oct. 8, 2010    (NZ) .......................... 588472

(51) Int. Cl.
*G08B 21/18*    (2006.01)
*E04H 17/10*    (2006.01)
*G01L 5/10*    (2006.01)

(52) U.S. Cl.
CPC .............. *G08B 21/182* (2013.01); *E04H 17/10* (2013.01); *G01L 5/103* (2013.01)

(58) Field of Classification Search
CPC .............................. G08B 21/182; G01L 5/103
USPC .............. 340/668, 550, 541, 548; 200/21.93; 73/862.321, 862.42
See application file for complete search history.

(56) References Cited

U.S. PATENT DOCUMENTS

| | | | |
|---|---|---|---|
| 5,103,207 A | 4/1992 | Kerr et al. | |
| 5,852,402 A * | 12/1998 | Perry | 340/541 |
| 6,578,438 B2 * | 6/2003 | Steinberg et al. | 73/862.381 |
| 6,646,563 B1 | 11/2003 | Buckley et al. | |
| 6,891,472 B2 * | 5/2005 | Tallman | 340/541 |
| 2006/0137476 A1 | 6/2006 | Bull et al. | |

FOREIGN PATENT DOCUMENTS

JP    406162355 A  *  6/1994

* cited by examiner

*Primary Examiner* — Toan N Pham
(74) *Attorney, Agent, or Firm* — Greer, Burns & Crain, Ltd.

(57) ABSTRACT

A wire fence accessory is provided including a connector configured to secure the accessory to a support post of a wire fence system; and a tension sensor configured to measure tension in a wire connected to the accessory and output a signal indicative of the tension, wherein the accessory includes an indicator configured to output, at the accessory, an indication of the tension in the wire according to the signal output by the tension sensor.

18 Claims, 3 Drawing Sheets

FENCING

STATEMENT OF CORRESPONDING APPLICATIONS

This application is based on the Provisional specification filed in relation to New Zealand Patent Application Number 588472, the entire contents of which are incorporated herein by reference.

TECHNICAL FIELD

The present invention relates to a device and method for indicating tension in a wire fence.

BACKGROUND ART

Fence systems that are capable of sensing tamper related activity on the fence wire are well known in the security industry. A wire fence system is one in which one or more wires are held in tension between two end supports. An end support may be any support where the wire of the fence is terminated, such as at a fixed post or another fixed physical structure (for example, a wall). A wire fence may include a number of intermediate supports, but need not do so. Reference to a wire fence, or taut wire fence throughout this specification should be understood to include an electrified wire fence as well as a conventional, non-electric, wire fence, unless specifically stated otherwise.

One means of breaching an electric security fence is to cut the wires of the fence. This kind of breach is easily detected by electrical signals that are interrupted by a cut wire and can then sound an alarm for the particular security zone being breached.

Another method by which an intruder can breach an electric taut wire security fence is by climbing the fence. This can result in the fence wires deflecting downwards and connecting together as a short circuit which can be detected as loss or reduction of electrical signal through a wire.

Yet another method of breaching an electric fence is to deflect the wires of the fence, as can occur by a person climbing onto the wire or otherwise pulling the wires apart to enable an intruder or object to pass through the fence. In such instances the wires may not short or open circuit the signal through the fence.

In both electric and conventional fences (not electrified) cutting, bending or spreading the wires changes the tension in the wires, which can be detected by a sensor.

For example, U.S. Pat. No. 4,829,287 discloses a taut wire intrusion detection system including a plurality of tension sensors which transmit signals to a processor associated with a particular post which analyses the signals, and transmits this information to a central control unit. Alarms indicating the location of a potential intrusion are then activated at the central location.

US Patent Application No. 2008/0106408 discloses a taut wire panel system including tensioned sensor wires, where excessive movement of the wire triggers a switch, causing a signal to be sent to activate an alarm associated with the panel in which the sensor wire is located.

It is generally important for the tension along the wire of a wire fence system to be kept within a prescribed range of tensions for effective operation of the fence under the conditions and purpose for which it is to be used.

If the tension is too loose then a cut or deflected wire may not be sensed as enough of a change in tension. If the tension is too high then it may cause problems with insulators, end post connections and to the fence wire—particularly when there is a drop in temperature and the resulting increase in tension on the wire may increase the level of damage. Further, if the tension is too high then the wire may reach its yield point and no longer maintain tension when the temperature cycles between a low temperature and a high temperature.

Additionally, if the tension is too high or too low, it may be outside the range of ideal operation of a tension sensor used to detect deflection of the wire—which may be either outside of a linear range, or in a significantly reduced resolution range of the sensor. In either of these cases the likelihood of detection of a tamper condition or an intruder will be reduced.

Strain gauges are known for measuring tension in a wire. However, such strain gauges require the person installing or maintaining the wire fence to know the optimal tension range for the fence, and read the gauge to mentally compare the reading to the optimal range.

Further, none of the prior art readily enable an installer or maintenance person to identify a fence wire which is outside of the allowable tension limits without manually testing each wire. Even if the maintenance person had prior knowledge of wires being triggered by false readings (assuming an intrusion is not occurring) from a central station before going out to the fence, they are required to manually match the alarm to the fence wire when in the field.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

SUMMARY

According to one aspect of the present invention there is provided a wire fence accessory including a connector configured to secure the accessory to a support post of a wire fence system; and a tension sensor configured to measure tension in a wire connected to the accessory and output a signal indicative of the tension, characterised in that the accessory includes an indicator configured to output, at the accessory, an indication of the tension in the wire according to the signal output by the tension sensor.

According to another aspect of the present invention there is provided a method of indicating tension in a wire of a wire fence system using a wire fence accessory including a connector configured to secure the accessory to a support post of the wire fence system, a tension sensor and an indicator, the method including the steps of:

a) connecting the wire fence accessory to the support post and wire;
b) sensing a measure of tension in the wire using the tension sensor; and
c) outputting a signal from the tension sensor indicative of the tension, the method characterised by the step of:

d) receiving the signal and outputting, at the accessory, an indication of the tension from the indicator according to the signal output by the tension sensor.

Preferably the wire fence accessory includes a main body integrating the tension sensor and indicator.

The accessory may be formed from a single material, or may have different portions formed from different materials. For example, some portion of the main body may be formed from a plastics material. This may be done for example to save cost, or to reduce the weight of the main body, or to insulate the tension sensor and associated indicator electronics from the high voltage of an electrified wire.

Such a configuration may also enable the accessory to act as an insulator between a high voltage electrified wire and an end support post, or a secondary run of wire.

In a preferred embodiment the connector is configured to connect directly to an end support mount of the fence system.

Reference to an end support mount should be understood to refer to a mounting or device (other than a wire) that is used to connect the accessory to an end support of the fence. An end support mount may commonly be fixed to an end support of a fence.

In one embodiment the connector may be configured to connect to an end support mount such that the accessory can swivel with respect to the end support mount.

After the accessory has been connected to a wire, the wire may need to be tensioned. This may be carried out by any of the usual methods of tensioning a wire fence as are well known to those skilled in the art.

It is implicit in this application to a wire fence that there will be a specified tension, or range of allowable tensions, for the wire so that the wire fence can function properly, for example as a security fence.

Reference will be made throughout this specification to a wire fence. However, those skilled in the art will appreciate that a fence may be formed from any strand or strip of material used to form a barrier between two connection points, and that reference to a wire should not be seen as limiting.

For example, the strands of a fence may be formed (without limitation) from metal, ribbon, plastic, carbon fibre or fiberglass or any combination thereof. A wire may or may not be electrically conductive (i.e. a wire fence may be a conventional non-electric fence or an electric fence).

In a preferred embodiment the accessory includes a tensioner.

A tensioner (i.e. any device configured to pull on an object attached to it) included in the main body of the accessory may be an advantage, particularly in re-tensioning an attached wire when required, for example during maintenance of a accessory or fence, as both the tensioner and the indicator are in the same place.

The tension sensor may preferably be in the form of a strain gauge which is adapted to measure the tension in a wire attached to the accessory.

The strain gauge may be provided by a thick film resistor paste connected to a suitable electronic circuit, such as are well known in the art, to detect a change in resistance of the thick film resistor paste due to a change in tension of the wire.

This is not intended to be limiting, and it should be appreciated that the tension sensor may be any suitable means as known in the art for measuring tension such as by way of other forms of resistive elements, fibre optic distortion, or utilising the piezoelectric effect.

In one embodiment, the accessory may be made up of two portions, with the tension sensor positioned between, and substantially hidden within the two portions. In doing so, the sensor may be contained to prevent exposure to environmental conditions or tampering.

Reference to an indication of tension should be understood to refer to any way in which datum about tension in the wire is presented to a user. By providing an indication of tension at the accessory, a number of advantages may be provided over prior systems which issue an alarm at a remote location, or simply in the general vicinity of a section of a fence. Specific examples are discussed below, but generally this may result in increased ease of installing or maintaining a wire fence by providing a visual or audible indication of optimal tension at the fence. The user may really identify the points requiring tensioning in the field, and utilise the indicator in adjusting the tension.

In a preferred embodiment, the indicator may include at least one light emitting device.

By emitting light to provide a simple visual indication of the tension of the wire at the accessory, the time required in both installation or maintenance may be greatly reduced. This is particularly applicable to maintenance, where an operator may simply visually scan a fence line to assess whether any of the wires require attention rather than individually testing the tension of each wire.

According to a preferred embodiment the at least one light emitting device may be a Light Emitting Diode (LED), although it should be appreciated that this is not intended to be limiting.

The at least one light emitting device may be configured to emit a plurality of different coloured lights—whether multiple devices of different colour, or a single device such as a multi colour LED.

In an alternative embodiment, the indicator may include a display, such as an LCD display.

It is envisaged that in an alternative embodiment the indicator may include a sound emitting device.

According to another aspect of the present invention there is provided a wire fence accessory configured to be connected to a wire in a wire fence system, including a tension sensor configured to measure tension in a wire connected to the accessory and output a signal indicative of the tension; and
an indicator configured to output, at the accessory, an indication of the tension in the wire according to the signal output by the tension sensor, characterised in that the indicator outputs a unique indication according to whether the measured tension is above, below, or within, a predetermined range.

According to another aspect of the present invention there is provided a method of indicating tension in a wire in a wire fence system using a wire fence accessory including a tension sensor and an indicator, the method including the steps of:

a) connecting the wire fence accessory to the wire;
b) sensing a measure of tension in the wire using the tension sensor;
c) outputting a signal from the tension sensor indicative of the tension; and d) receiving the signal and outputting, at the accessory, an indication of the tension from the indicator according to the signal output by the tension sensor, the method characterised in that:

the step of outputting the indication from the indicator includes determining whether the measured tension is above, below, or within, a predetermined range and outputting a unique indication accordingly.

In the above case, reference to the wire fence accessory should be understood to mean any portion of a wire fence system by which a wire may be connected to a support post, directly or indirectly. For example, the wire accessory may be a gate handle as commonly used in portable electric fencing, or a connector joining two wires connected to respective support posts.

In a preferred embodiment the indicator may be configured to indicate whether the tension of the wire attached to the accessory is too high, too low, or within a range predetermined to be acceptable.

This may enable a person installing or maintaining the wire fence to easily assess whether adjustment of the tension is necessary, and to what degree.

For example, the indicator may be configured to activate a particular light, or emit a particular colour of light, to indicate the level of tension.

Alternatively, the sound emitting device may emit a tone whose frequency is dependent on the tension of the wire according to the signal output by the tension sensor.

The indicator may also be configured to indicate when the tension in the wires is correct and the tension measuring accessory is functioning correctly. In requiring only two modes of function (fault, no fault), the number of components forming the indicator may be reduced—potentially aiding in reducing the complexity of the accessory both in terms of cost and use.

In both embodiments, the indicator may be configured to indicate a level of tension by way of emitting patterns (whether light or sound). For example, a slow repeating pulse may indicate that the tension is too low, a fast pulse that the tension is too high, and a constant output to indicate that the tension is within an acceptable range.

It is envisaged that the indicator may also be configured to indicate whether there is a fault condition associated with the accessory (such as low power, or malfunction of the sensor). For example, this may be achieved by way of a particular light emitting accessory flashing in a particular pattern.

Preferably the accessory includes a decision making means. Reference to a decision making means should be understood to be any means configured to receive and process the output signal of the tension sensor and control activation of the indicator accordingly.

Preferably the decision making means is a processor, however it should be appreciated that determination of whether the indicator should be activated to output an indication of tension in response to the sensor output may be achieved by analogue circuitry, such as a simple comparator.

The decision making means may be configured to apply the measured tension of the wire to an algorithm or look up table to determine whether the tension is within a range predetermined to be acceptable.

In a further preferred embodiment the accessory includes a temperature sensor configured to measure ambient temperature. The applicants have found that environmental effects, such as temperature, shading due to clouds, wind etc, may affect the tension in the wires. It is therefore important to consider these effects when analysing the values of tension and their rate of change.

The applicants have found that the temperature in the vicinity of the wire fence may have a significant effect on the tension of wires in the fence system. It may also affect performance of the tension sensor itself. This information may be sensed by a temperature sensor (thermocouple, etc), transmitted to the decision making means and incorporated in the analysis carried out to assist with determination of whether the tension is within the acceptable range.

The decision making means may also account for the mechanical properties of the wire according to the its material—for example whether the wire is galvanized steel or an aluminium alloy.

In a preferred embodiment the accessory includes communications and data transmission circuitry.

The transmission circuitry may transmit or receive data either along the fence wire, or along a dedicated communications wire or along a power supply wire or wirelessly back to a central control unit. It should be appreciated that such circuitry may be incorporated into the decision making means.

The accessory may transmit the output of the tension sensor to a central control location so that an alarm may be raised—either in terms of a potential security breach, or indicating when wires in the wire system need maintenance because they are outside their optimal operating conditions.

It should be appreciated that the decision making means may be located at the central control location. In practice there may be many advantages, both in cost and security, to process the tension measurements remotely from the fence in a secure site.

In a preferred embodiment the indicator may be configured to indicate the tension on the wire on receiving an interrogation signal. The communications circuitry at the accessory may be configured to receive other data or commands from the central control location, such as to place the accessory into one of its indication modes.

For example, an accessory may receive a command to activate its indicator in order to indicate the tension of the wire connected to the accessory. Alternatively, only accessories connected to a wire having a level of tension that reflects a need for maintenance may be activated, or all accessories may activated to output an indication showing whether the accessory is functioning correctly. It should be appreciated that communication of control signals may be to individual accessories, or all accessories connected to a network.

When the accessory is utilized in a wire security system, in normal use the indicator would be in an inactive mode, thereby reducing power consumption and wear on its components. When either installing or maintaining the fence, the indicator may be placed in an active mode.

In a further embodiment of the invention, the accessories may be placed in a "test" mode where each of the wires in a fence are displaced, causing an increase in tension on each accessory. The indicator may then output an indication that the tension sensor has sensed the change in tension allowing the installer or maintenance person to confirm the correct operation of the tension sensor for intruder or tamper detection.

The accessory may be configured to detect a gradual change in tension, and issue a maintenance alarm. Adjustment or retensioning of the wire may be required as a result of wire aging or extreme temperature changes. It is envisaged that a maintenance alarm condition may be determined as being the gradual change in tension until outside upper or lower absolute tension thresholds are met or exceeded. In contrast, a tamper alarm condition would be where a rapid tension change occurs where the rate of change of tension and change in tension value exceeds a predefined threshold. Alarms may be issued via the indicator, or via the communications and data transmission circuitry.

For a firmware and/or software (also known as a computer program) implementation, the techniques of the present invention may be implemented as instructions (for example, procedures, functions, and so on) that perform the functions described. It should be appreciated that the methodology of the present invention is not described with reference to any particular programming languages, and that a variety of programming languages could be used to implement the present invention. The firmware and/or software codes may be stored in a memory, or embodied in any other processor readable medium, and executed by a processor or processors. The memory may be implemented within the processor or external to the processor.

A processor may be a microprocessor, but in the alternative, the processor may be any controller, microcontroller, or state machine. A processor may also be implemented as a combination of computing accessories, for example, a combination of a digital signal processor (DSP) and a microprocessor, a plurality of microprocessors, one or more microprocessors in conjunction with a DSP core, or any other such configuration.

The steps of a method, process, or algorithm described in connection with the present invention may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The present invention may have many advantages over the prior art systems, including:
- increased ease of installing or maintaining a wire fence by providing a visual or audible indication of optimal tension at the fence;
- further increased ease of installing or maintaining the fence by enabling determination of optimal tension at the fence regardless of light levels (such as at night);
- improved ease of maintenance through the ability to indicate at the accessory whether the accessory is functioning correctly for each all of the wire sense wires;
- the ability to check whether the tension in the wire is correct for each wire sensing wire taking into account ambient conditions such as temperature;
- reduced maintenance time by providing the ability to easily isolate which of the wires in a wire security system require maintenance amongst a large number of sense wires. In a large security system there may be over 100 electrified zones where each zone is made up of 20 individual wires—resulting in some 2000 wires requiring their tension to be monitored. By providing an visual indication at the accessory, the fence line may be scanned for a visual indication of wires that are outside their allowable tension range.

BRIEF DESCRIPTION OF THE DRAWINGS

Further aspects of the present invention will become apparent from the ensuing description which is given by way of example only and with reference to the accompanying drawings in which.

DETAILED DESCRIPTION

Figure 1:
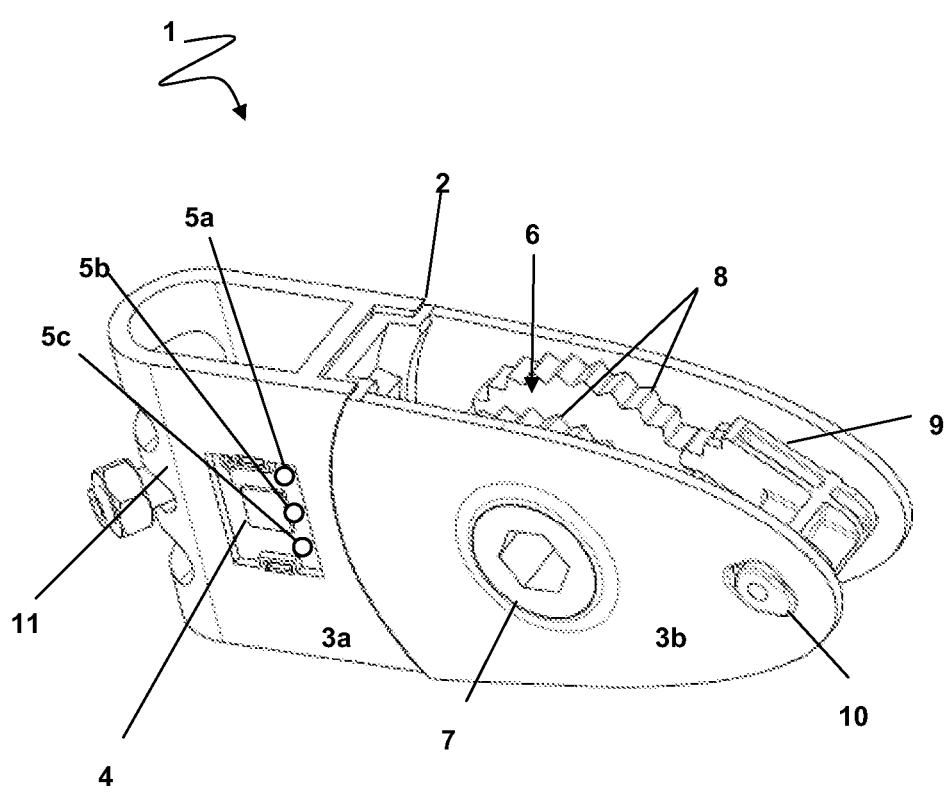
FIG. 1 illustrates a tension indicator accessory according to an embodiment of the present invention.

FIG. 1 illustrates a wire fence accessory (generally indicated by arrow 1) according to one embodiment of the present invention:

The wire fence accessory (1) takes the form of a fence main body having a main body (2) made up of a first portion (3a) and a second portion (3b). The first portion (3a) incorporates a connector (11) by which the accessory (1) is secured to a fence support.

The accessory (1) also includes a strain gauge (not clearly shown), positioned between the first portion (3a) and second portion (3b) of the main body (2). The strain gauge is a thick film resistor type gauge, configured to measure tension in a wire connected to the main body and output a signal indicative of the tension.

A microcontroller (4) is configured to receive the output signal and determine whether the tension in the wire is above, below, or within a range of values predetermined to be acceptable. The microcontroller utilizes temperature readings obtained from a temperature sensor (not shown) in determining the optimal tension.

The accessory (1) also includes an indicator in the form of three light emitting diodes (LEDs) (5a, 5b, 5c). The first LED (5a) is coloured red, the second LED (5b) is coloured green, and the third LED (5c) is coloured blue.

The microcontroller (4) is configured to control activation of the LEDs (5a, 5b, 5c) according to the measured tension in the wire. If the tension is too high, the red LED (5a) is activated. If the tension is within the acceptable range, the green LED (5b) is activated). If the tension is too low, the blue LED (5c) is activated.

The accessory (1) also includes a spool (6) located in the second portion (3b) of the main body (2) to which a wire (not shown) is wound. The spool (6) is coaxially mounted on an axle (7) with a tensioner in the form of a ratchet (8) and pawl (9). The pawl (9) is mounted on an axle (10).

If either the red LED (5a) or blue LED (5c) are activated, a person installing or maintaining the fence may adjust the tension in the wire by rotating the tensioner until only the green LED (5b) is activated.

Figure 2:
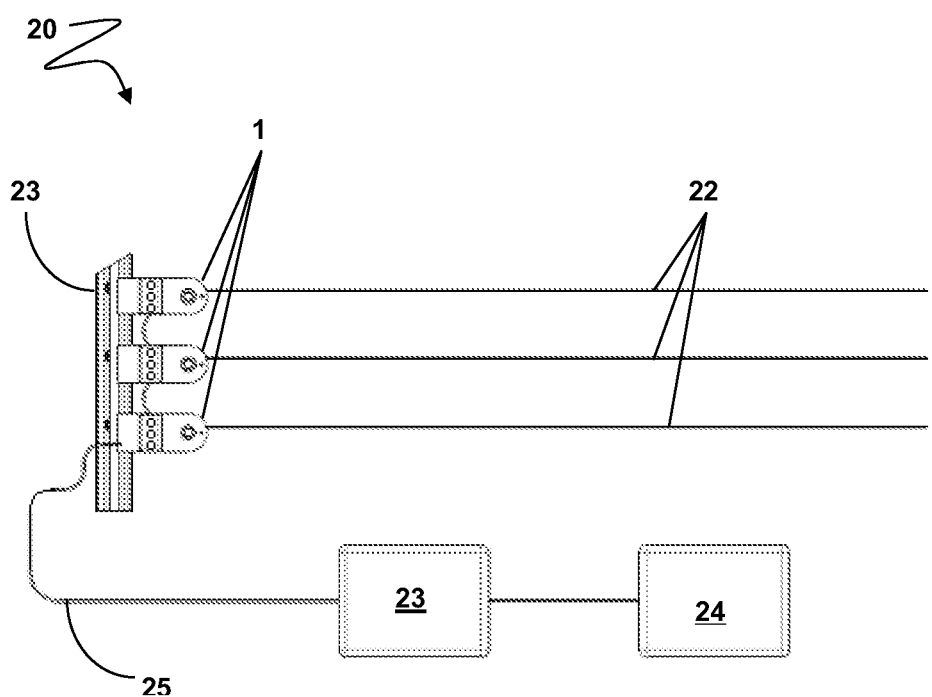
FIG. 2 illustrates a tension indicator accessory in a wire fence system according to an embodiment of the present invention.

FIG. 2 illustrates the accessory (1) of FIG. 1 as implemented in a wire fence system (generally indicated by arrow 20).

Each accessory (1) is mounted to a fence support (21) connected to a fence wire (22).

Each accessory (1) is also connected to a central control station (23) and power supply (24) via a communications/power link (25).

The central control station (23) is configured to receive information from each accessory (1), and report the wires (22) which require maintenance.

An operator may control the accessories (1) via the central control station (23) to select a maintenance mode whereby the red or blue LEDs (5a, 5c) of all accessories (1) connected to wires (22) having a tension outside the predetermined acceptable range are activated.

Figure 3:
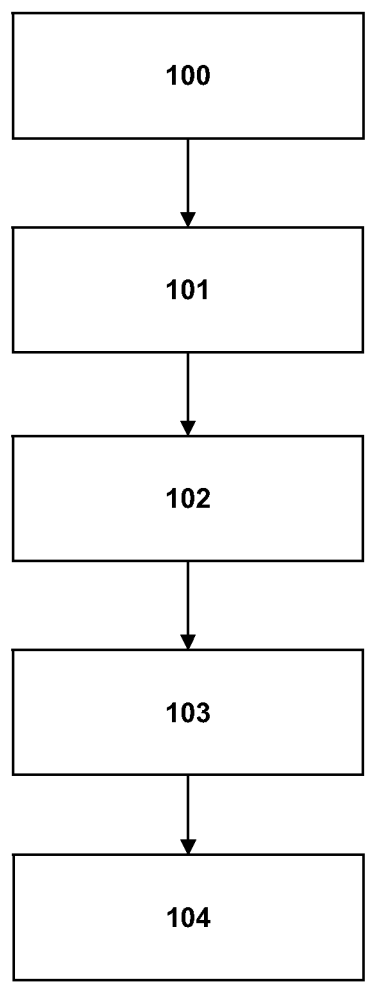
FIG. 3 shows a flow chart illustrating a method of indicating tension in a wire according to one embodiment of the present invention.

FIG. 3 is a flow chart illustrating a method of indicating tension in a wire using a tension indicator accessory (1) as described with reference to FIGS. 1 and 2.

In step 100, the wire (22) is connected to the spool (6) of the main body (2).

In step 101, the strain gauge measures the tension in the wire (23).

In step 102, the strain gauge outputs a signal indicative of the tension.

In step 103, the microcontroller (4) receives the signal and determines whether the tension is above, within, or below a predetermined range of tension values considered to be acceptable.

In step 104, the microcontroller (4) activates the LEDs (5a, 5b, 5c) according to whether the tension is above, within, or below a predetermined range of tension values considered to be acceptable.

Aspects of the present invention have been described by way of example only and it should be appreciated that modifications and additions may be made thereto without departing from the scope thereof as defined in the appended claims.

What we claim is:

1. A wire fence accessory comprising:
    a connector configured to secure the accessory to a support post of a wire fence system;
    a tension sensor configured to measure tension in a wire connected to the accessory and output a signal indicative of the tension; and
    an indicator configured to output, at the accessory, an indication of the tension in the wire according to the signal output by the tension sensor, wherein the indication uniquely identifies whether the measured tension is one of: above, below, or within a predetermined range of tension values.

2. The wire fence accessory as claimed in claim 1, wherein the indicator comprises at least one light emitting accessory.

3. The wire fence accessory as claimed in claim 2, wherein the at least one light emitting accessory is configured to emit a different color for each unique identification of whether the measured tension is one of: above, below, or within, the predetermined range of tension values.

4. The wire fence accessory as claimed in claim 2, wherein the at least one light emitting accessory comprises at least three light emitting accessories, selectively activated to indicate whether the measured tension is one of: above, below, or within, the predetermined range of tension values.

5. The wire fence accessory as claimed in claim 1, wherein the indicator comprises a sound emitting accessory.

6. The wire fence accessory as claimed in claim 5, wherein the sound emitting accessory is configured to emit a tone with a frequency according to the tension of the wire.

7. The wire fence accessory as claimed in claim 1, wherein the accessory comprises a decision making means configured to determine whether the measured tension is one of: above, below, or within the predetermined range of tension values using the signal output by the tension sensor.

8. The wire fence accessory as claimed in claim 1, wherein the accessory comprises a temperature sensor.

9. The wire fence accessory as claimed in claim 1, wherein the accessory comprises communications and data transmission circuitry.

10. The wire fence accessory as claimed in claim 9, wherein the accessory is configured to transmit the signal output by the tension sensor to a central control location.

11. The wire fence accessory as claimed in claim 10, wherein the indicator is configured to indicate the tension on the wire on receiving an interrogation signal from the central control location.

12. The wire fence accessory as claimed in claim 9, wherein the accessory is configured to receive a signal from a central control location selecting between at least a first and second modes of operation for the accessory,
    wherein in the first mode of operation, the indicator outputs the indication of the tension in the wire, and
    wherein in the second mode of operation, the indicator does not output the indication of the tension in the wire indicator.

13. The wire fence accessory as claimed in claim 1, wherein the tension sensor is a strain gauge.

14. The wire fence accessory as claimed in claim 1, wherein the wire fence accessory comprises a main body integrating the tension sensor and the indicator.

15. A method of indicating tension in a wire of a wire fence system using a wire fence accessory comprising a connector configured to secure the accessory to a support post of the wire fence system, a tension sensor and an indicator, the method comprising the steps of:
    a) connecting the wire fence accessory to the support post and wire;
    b) sensing a measure of tension in the wire using the tension sensor;
    c) outputting a signal from the tension sensor indicative of the tension; and
    d) receiving the signal and outputting, at the accessory, an indication of the tension from the indicator according to the signal output by the tension sensor, wherein the indication uniquely identifies whether the measured tension is one of: above, below, or within, a predetermined range of tension values.

16. The method as claimed in claim 15, wherein outputting an indication of the tension from the indicator comprises activating a light emitting accessory.

17. The method as claimed in claim 15, wherein outputting an indication of the tension from the indicator comprises activating a sound emitting accessory.

18. The method as claimed in claim 15, including the step of receiving a signal from a central control location selecting between at least a first and second modes of operation for the accessory,
    wherein in the first mode of operation the indicator outputs the indication of the tension in the wire, and
    wherein in the second mode of operation the indicator does not output the indication of the tension in the wire indicator.

* * * * *